(12) United States Patent
Young

(10) Patent No.: US 6,404,344 B1
(45) Date of Patent: Jun. 11, 2002

(54) METHOD OF COMPENSATING FOR ERRONEOUS READING IN A MASS FLOW METER

(75) Inventor: Gary C. Young, Cedar Rapids, IA (US)

(73) Assignee: GYCO, Inc., Cedar Rapids, IA (US)

(*) Notice: Subject to any disclaimer, the term of this patent is extended or adjusted under 35 U.S.C. 154(b) by 0 days.

(21) Appl. No.: 09/510,815

(22) Filed: Feb. 23, 2000

(51) Int. Cl.⁷ .............................................. G08B 21/00
(52) U.S. Cl. ...................... 340/606; 340/600; 340/603; 73/861.11; 73/861.25
(58) Field of Search ................................ 340/606, 600, 340/603; 73/861, 861.18, 861.25, 861.11, 861.08, 861.41, 861.73, 861.74, 861.26; 702/45, 46, 47, 50

(56) References Cited

U.S. PATENT DOCUMENTS

| | | | | |
|---|---|---|---|---|
| 3,640,136 A | * | 2/1972 | Nolte | 73/228 |
| 5,546,813 A | * | 8/1996 | Hastings et al. | 73/961.29 |
| 6,256,590 B1 | * | 12/1998 | Keech | 702/45 |
| 5,940,290 A | * | 8/1999 | Dixon | 364/138 |
| 5,986,553 A | * | 11/1999 | Young | 340/606 |

* cited by examiner

Primary Examiner—Jeffery Hofsass
Assistant Examiner—Phung Nguyen
(74) Attorney, Agent, or Firm—Slater & Matsil, L.L.P.

(57) ABSTRACT

A method of correcting reading of a non-contact solids flow meter measuring solid particulate flow where the solid particulate product enters the flow tube at one end and flows past a sensor and then exits the flow tube. The sensor for the flow meter is very sensitive and not only can sense particulate flow, but can also pick up system machinery motion such as the rotation of a screw conveyor or other moving machinery parts as product flow and provide a system output reading in excess of the actual flow rate. In addition, if the product flow creates dust during the initial calibration process, and the dust is controlled at the actual installation, the system output reading may indicate a flow rate substantially less than the actual flow. The calibration method of this invention uses the original calibration or performance curves to accurately correct the output readings.

20 Claims, 8 Drawing Sheets

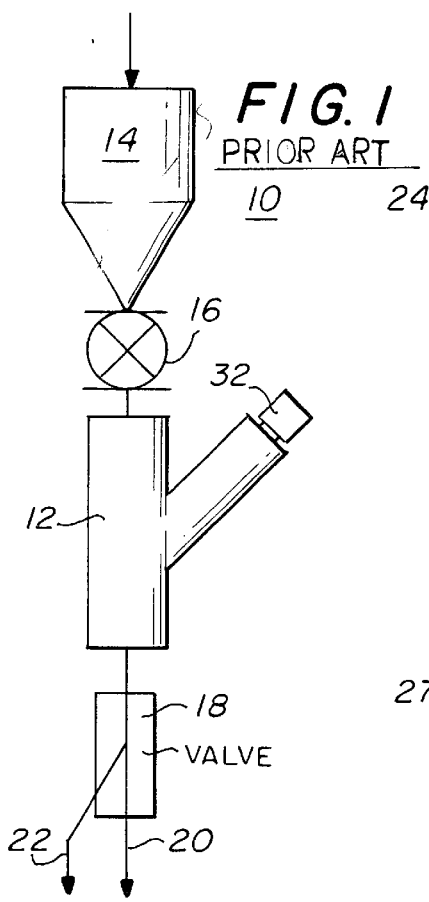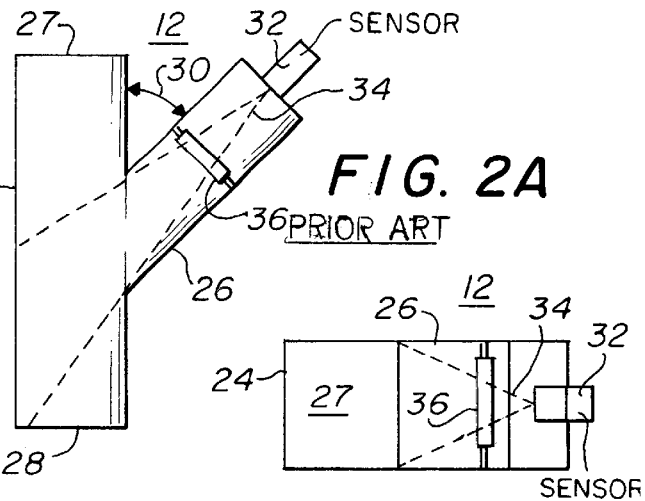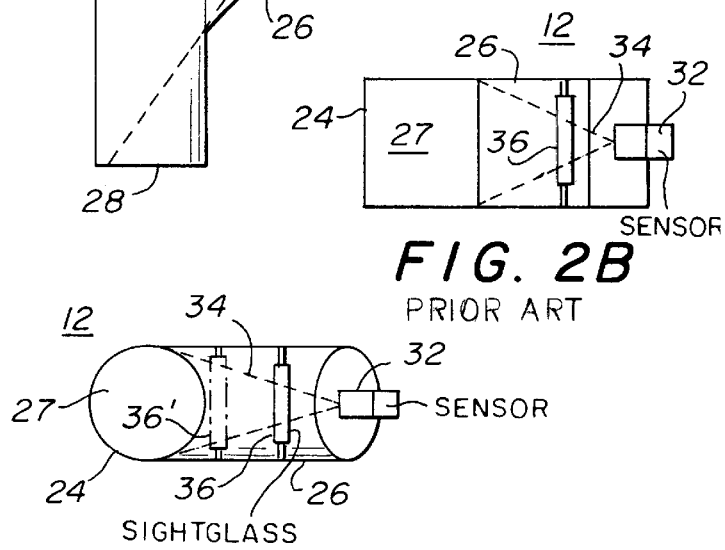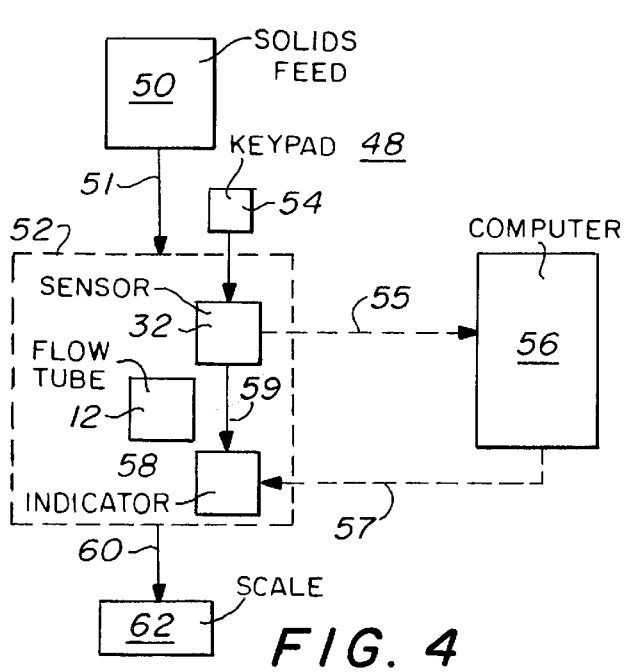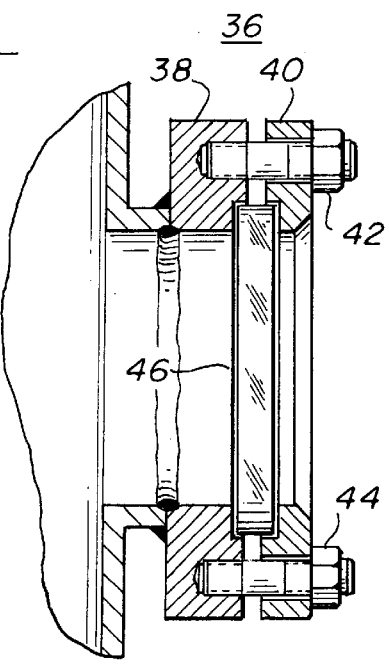

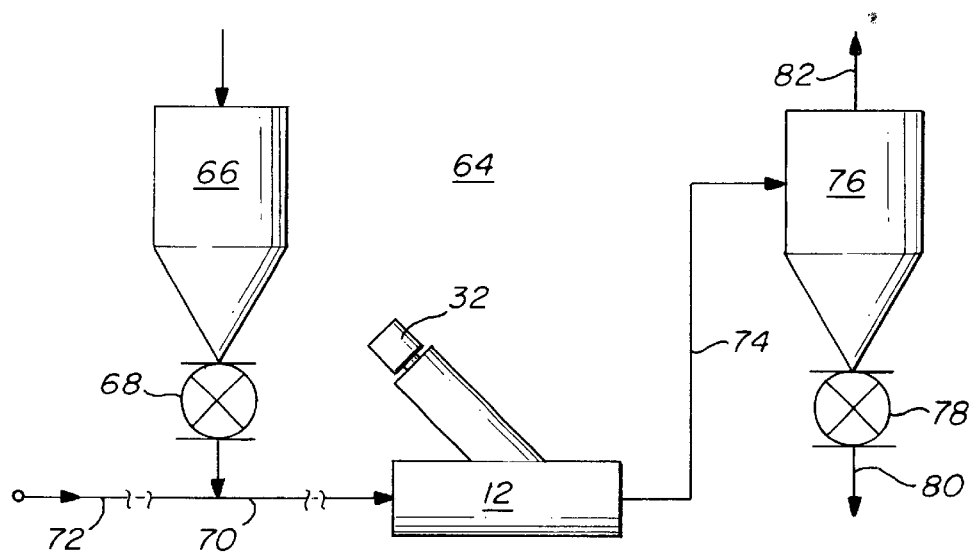
FIG. 10
PRIOR ART
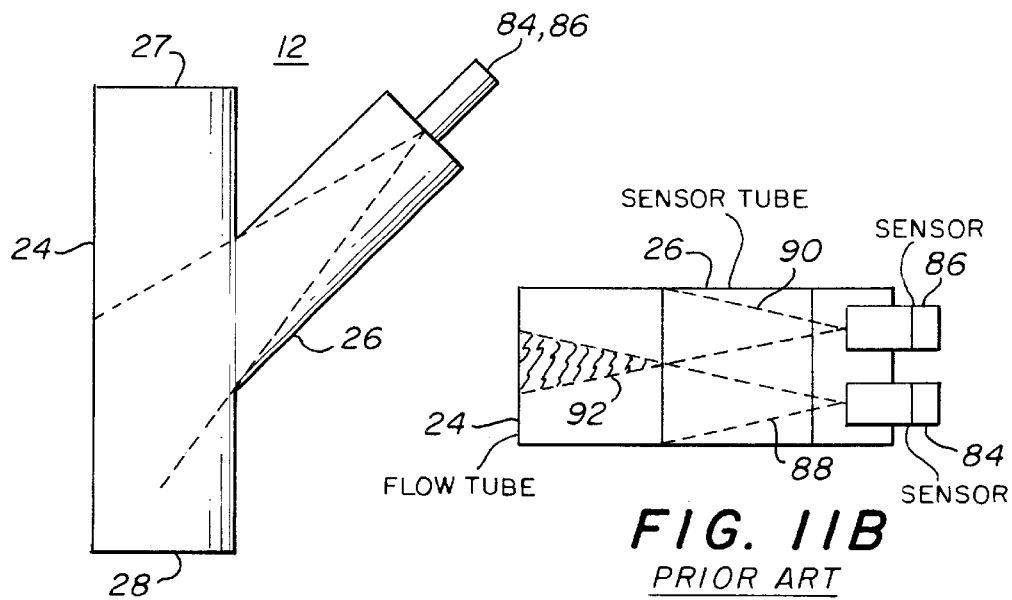
FIG. 11A
PRIOR ART
FIG. 11B
PRIOR ART
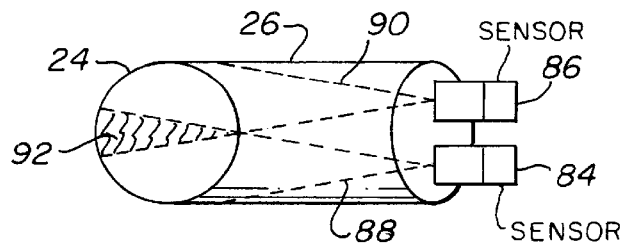
FIG. 11C PRIOR ART

METHOD OF COMPENSATING FOR ERRONEOUS READING IN A MASS FLOW METER

BACKGROUND OF THE INVENTION

1. Field of the Invention

This invention relates generally to flow measurement of particulate streams and in particular to methods for correcting erroneous measurements of particulate streams due to motion other than the motion of particulate matter being measured.

2. Description of Related Art Including Information Disclosed Under 37 CFR 1.97 and 1.98

Flow measurement of particulate streams such as wet cakes, grains, cereals, dry powders, minerals, pharmaceuticals, dairy powders, chemicals, spices, snack foods, cement, resins, plastics, fibrous materials, and others is critical to the operation and optimization of a given process. A non-contact flow meter is of great importance since measurements are obtained without interfering with the flow of product through the process transfer line. For flow measurement of some products through transfer lines, this is critical since any obstruction in the line can cause buildup and eventual pluggage. In addition, no degradation of the material occurs since the flow is unobstructed. Also, the integrity of the process is maintained with a non-contact flow meter. For example, with food and pharmaceutical manufacturing, a truly non-contact solids flow meter obtains measurements without any contamination of the process since, being a non-contact device, the integrity of the process is never compromised. This factor is important when considering food, pharmaceutical, mineral, and chemical manufacturing.

Some typical applications for flow/quantity measurements are: feed to dryers, discharge from dryers, feed to milling operations, flow to mixers, flow from dust collectors, flow from conveyors, loading/unloading of railcars, loading/unloading of trucks, loading/unloading of barges, flow of grains through ducts, cement loading/unloading, flow of plastic granules, flow from cyclones, flow in pneumatic transfer lines, loading/unloading of silos, and feed to reactors to mention a few applications.

In U.S. Pat. No. 4,091,385, a Doppler radar flow meter is disclosed in which the flow meter comprises a radar transmitter and receiver that respectively radiates radio waves at a predetermined microwave frequency at least partially through a fluid and receive at least a portion of the radio waves backscattered by at least some of the particulate matter in the path of the radiated radio waves. A signal processor connected to the receiver produces a signal related to the Doppler's shift in frequency between the backscattered radio waves and the radiated radio waves and, thus, the frequency is related to the velocity of flow of the particulate matter being measured. In particular in this case, the flow meter is used for velocity of flow of fluids such as blood in conduits such as blood vessels.

U.S. Pat. No. 5,550,537 discloses an apparatus for measuring mass flow rate of a moving medium using Doppler radar. The patent discloses a non-intrusive mass flow rate meter that includes a transceiver that transmits an electromagnetic signal of known frequency and power to illuminate a portion of moving material. The transceiver detects the magnitude and the Doppler shift of the electromagnetic signal that is reflected by material moving along the process flow as it passes through the electromagnetic field established by the signal. The transceiver then combines the magnitude of the reflected electromagnetic signal along with the Doppler shift between the frequency of the transmitted and reflected electromagnetic signals to generate an output signal related to the mass flow rate of the material. The problem with the 5,550,537 patent is that only a portion of the moving material is illuminated. This creates errors in the mass flow rate and thus in the quantity of material that is passing through the conduit.

U.S. Pat. No. 5,986,553 issued to the same inventor as the present invention discloses an improved flow meter for measuring solid particulate flow rates by radiating the particulate flow path through a conduit such that substantially all of the particulate matter contributes to and forms backscatter energy. The backscatter energy is used to generate an electrical signal that is proportional to the consolidation of solid particulate matter flowing through the conduit. The flow meter described in U.S. Pat. No. '553 is quite sensitive to motion and normally very accurate. However, because of its sensitivity to particulate motion it is also sensitive to various "motions", other than the particulate material motion, which are often present in a particulate matter distribution system. For example, the motion of a rotating screw conveyor or product dust can be sensed by the system and result in an erroneous indication of the output particulate flow rate.

SUMMARY OF THE INVENTION

The present invention discloses a method of compensating and correcting a non-contact mass flow meter which measures the flow of particulate streams through ducts, chutes, or pipes utilizing a Doppler-radar sensor, a unique flow tube, a flow rate and totalizer indicator, and an algorithm to convert the sensor output signal to mass flow rate. For example, in the unique flow meter disclosed in U.S. Pat. No. 5,986,553, the solid particulate matter flows along a first hollow conduit with a second hollow conduit having at least the same diameter as the first conduit and being joined to the first conduit at an angle. At least one sensor is associated with the second hollow conduit and includes a transmitter of electromagnetic energy for radiating the entire particulate matter flow path formed by the first conduit such that substantially all of the particulate matter contributes to and forms backscattered energy. A receiver receives the backscattered energy and generates an electrical signal that is proportional to the concentration of solid particulate matter flowing in the first hollow conduit. A processor is coupled to at least one sensor for generating an output signal representative of the concentration of the solid particulate matter.

In one embodiment described in U.S. Pat. No. 5,986,553, the solid particulate matter flows past the sensor at a substantially constant velocity that is achieved by placing a source of the particulate matter a predetermined distance above the sensor for achieving the substantially constant velocity by gravity flow. In another embodiment described in the '553 patent, a source of pneumatic pressure is coupled to the first conduit for conveying the particulate matter past the sensor at the substantially constant velocity.

A sightglass is preferably interposed in the second hollow conduit between the sensor and the particulate matter. The electrical signal generated by the receiver is typically a non-linear signal measured in either milliamps or volts. The processor converts the milliamp or volt signal into a pounds-per-hour mass flow rate. A totalizer generates a total quantity value of the material delivered.

The processor includes a memory for storing at least one algorithm for converting the signal generated by the receiver into a continuous range of values to a pounds-per-hour mass flow rate. In the described embodiment, the memory stores a first algorithm for converting a signal generated by the receiver in a first range of values to a pounds-per-hour mass flow rate and stores a second algorithm for converting the signal generated by the receiver in a second continuous range of values to a pounds-per-hour mass flow rate to enhance accuracy of the flow meter.

In the preferred embodiment, the first algorithm has the form of $F=aE^b$ ($Y=aX^b$), where F=pounds/hour, E=electrical signals as milliamps or volts, and a and b are constants and the second algorithm has the form of $F=a_0+a_1E+a_2E^2+a_3E^3+a_4E^4$ ($Y=a_0+a_1X+a_2X^2+a_3X^3+a_4X^4$) were F=pounds/hour, E=milliamps, and $a_0$, $a_1$, $a_2$, $a_3$, and $a_4$ are constants.

Further, a central processing unit is coupled between the receiver and the industrial computer for calculating constants for the first and second algorithms for use by the industrial computer or smart indicator. Alternatively, the processor itself may include a central processing unit for calculating the constants for the first and second algorithms and generating mass flow rate in pound-per-hour. It further may have a converting means in the central processing unit for converting the mass flow rate to total pounds.

The present invention relates to a method of correcting or compensating for erroneous readings of a flow meter of the type disclosed in U.S. Pat. No. '553 resulting from sensing motion in the system other than motion or movement of the particulate matter.

According to the invention the correction is achieved by generating data points represented by an initial performance curve or initial algorithm under controlled conditions such as in a laboratory. The initial algorithm or performance curve will typically show a relationship between the electrical output signal (typically in milliamps or volts) for different known flow rates. After the flow meter is installed into its working environment the system is operated in its normal manner and at a known flow rate to determine a corresponding electrical signal.

A correction factor is then computed for either the mass flow rate parameter (F) or the electrical signal parameter (E) by using the electrical signal determined at the known flow rate and the initial algorithm.

An adjusted algorithm is then developed by subtracting the correction factor in the initial algorithm. Thus it is seen that sensing motion not actually representing the flow of particulate material may result in a corrected value that can be less than the indicated flow rate such as a situation where the motion of a screw conveyor is the source of error. The corrected value could also be greater than the indicated flow rate as could be the case if the laboratory calibrating process was subjected to backscatter due to grain dust and the grain dust was not present in the final installation. However, the important consideration for either situation is that the laboratory calibration procedure develops an algorithm or a performance curve that represents the flow meter and may be readily adjusted for the particular environment at the final installation. Thus, extensive recalibration is not required even though the individual values of flow rate per unit of sensor output as represented by the initial algorithm or performance curve are substantially different from the flow rate per unit of sensor output as determined from the adjusted algorithm or performance curve.

According to an embodiment for correcting the machinery motion, the system is operated at a zero flow rate to determine a flow rate correction factor at a specific electrical signal value, and according to a preferred embodiment for correcting for dust, etc., the system is operated at a known positive flow rate to obtain an electrical signal correction factor at a specific flow rate.

BRIEF DESCRIPTION OF THE DRAWINGS

These and other features of the present invention will be more fully disclosed when taken in conjunction with the following DETAILED DESCRIPTION OF THE PREFERRED EMBODIMENT(S) in which like numerals represent like elements and in which:

FIG. 1 is a prior art diagrammatic representation of a typical flow meter application for the non-contact mass flow meter in a gravity flow application;

FIG. 2A is a side view of a prior art flow tube and attached sensor tube;

FIG. 2B is a top view of a prior art rectangular flow tube with the sensor tube attached;

FIG. 2C is a top view of a prior art circular flow tube with a sensor tube attached;

FIG. 3 is a cross-sectional view of a typical sightglass that could be used with the flow meter shown in FIG. 1;

FIG. 4 illustrates the equipment necessary to calibrate the solids flow meter of the flow meter of FIG. 1;

FIG. 10 is a diagrammatic representation of a typical prior art pneumatic conveying non-contact solids flow meter; and FIG. 11A is a side view of a flow tube utilizing at least two sensors;

FIG. 11B is a top view of a rectangular flow tube utilizing two sensors;

FIG. 11C is a top view of a circular flow tube utilizing two sensors;

DETAILED DESCRIPTION OF THE PREFERRED EMBODIMENT(S)

Figure 5:
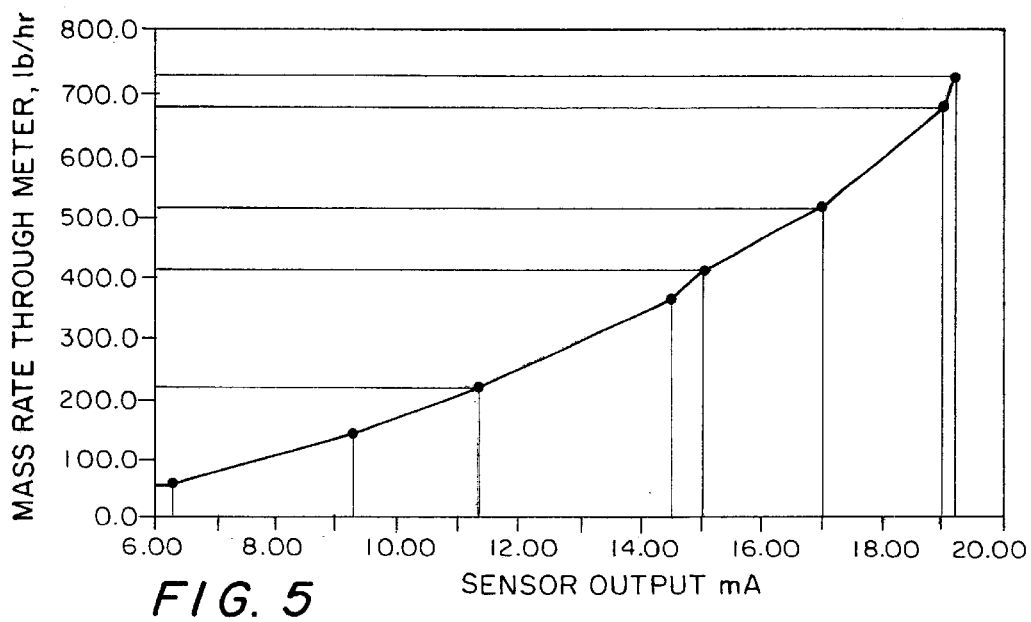
FIG. 5 is a graph of mass rate through the meter in FIG. 1 in pounds-per-hour versus sensor output in milliamps illustrating the original non-linear calibration data used to create an algorithm.

FIG. 1 is a prior art view showing a typical flow meter application for the non-contact mass flow meter 10 in a gravity flow application. A product such as a cereal flows into a product bin 14 and a rotary air lock 16 at the bottom of the bin discharges the cereal to a flow meter 12. The flow meter 12 measures mass rate (pounds/hour) and quantity (pounds). The product discharged from the bottom of the flow meter 12 passes through a manual divert valve 18 which enables the product to follow either path 20 or path 22.

It will be noted that the distance from the solids feed equipment (in this case the rotary air lock 16) to the flow meter 12 would be kept the same for calibration and the actual application or installation into an industrial plant. This would ensure that the initial particulate velocities would be nearly identical at the flow meter both during the calibration conditions and the end use conditions under which the meter would finally operate.

The flow tube design is one of the important attributes of the present invention. It is important that the low-energy microwave beam emitted from the sensor 32 shown in FIG. 1 and prior art view FIGS. 2A, 2B, and 2C cover the entire cross-sectional area of the flow tube 24. In this manner, substantially all particulate materials flowing through the flow tube 24 come in contact with the beam and thus the reflected Doppler-shifted energy picked up by the sensor 32 will be a signal truly representative of the solids flow through the flow tube 24.

Thus as can be seen in FIG. 2A the non-contact solids flow meter flow tube and sensor arrangement 12 comprises the material flow tube 24 having a product inlet 27 and a product outlet 28 and is attached at an angle 30 to a sensor tube 26 that has a sensor 32 mounted thereon for transmitting the low-energy microwave beam 34 through a sightglass 36 and across the entire cross-sectional area of the flow tube 24. The angle 30 may vary from about 10° to 90°. Further the flow tube 24 may be vertical as shown or at an angle to the horizontal. For example only, the flow tube 24 may be at an angle of 60° to the horizontal. As shown in the top views 2B and 2C, the top view of a rectangular flow tube 24 and a circular flow tube 24, respectively, the beam 34 from sensor 32 in each case covers the entire cross-sectional area of the flow tube. Thus, the tube 26 holding the sensor 32 is of the same diameter as the flow tube 24. Note that the sensor 32 in both FIGS. 2B and 2C is located at a distance from the flow tube path such that the beam width covers the entire diameter or cross-sectional area of the flow tube. In such case, a back-reflected Doppler-shifted energy signal is representative of the entire solids flow. It can be seen then that the sensor 32 must be properly positioned at the right distance from the centerline of flow tube 24 or the beam 34 will be too narrow to cover all of the material in the flow tube or will be so far away that the maximum energy would not be received from the reflected energy from the flowing material. In each case, the beam 34 passes through a sightglass 36 to form a non-contact flow meter.

FIG. 3 discloses a typical sightglass 36 that can be positioned as shown in FIGS. 2A, 2B and 2C in the sensor tube 26.

FIG. 4 illustrates a calibration circuit 48 containing equipment set up to calibrate the solids flow meter 52 illustrated in dashed lines. This flow meter is of the type disclosed in U.S. Pat. No. 5,986,553 wherein substantially all of the particulate matter can be illuminated by the radar or high frequency beam. As can be seen in prior art FIG. 4, solids feed equipment 50 supplies the particulate solid (mass flow at a constant mass rate to meter 52) through a duct 51. The flow meter 52 is comprised of the flow tube 12, sensor 32, and industrial computer or smart indicator 58 with the mass flow from the flow meter 52 passing through duct 60 and weigh scale 62 for measuring the mass rate through the flow meter 52. Sensor 32 output on line 55 is connected to computer 56 that is typically used to analyze the calibration data and compute an algorithm for the industrial computer or smart indicator 58 via computer output 57. Usually two, and preferably more than two, mass flow rates and associated sensor output data are collected and used to determine an algorithm. Once the calibration procedures have been completed and the algorithm placed into industrial computer or smart indicator 58, the sensor 32 output is connected at 59 to industrial computer or smart indicator 58 that contains the algorithm and communication connections 55 and 57 are not used.

The sensor 32 could be a Granuflow GMR130 microwave solids flow indicator made by Endress+Hauser or a Model SSI microwave solids flow indicator by Monitor Manufacturing Company or equivalent. Computer 56 could be a personal computer such as a Gateway 2000 Pentium computer or equivalent. Industrial computer 58 could be an Allen Bradley PLC (programmable logic controller) or leukhardt Systems, Inc. industrial computer or a Contec Microelectronics, Inc. industrial computer or equivalent. If a smart indicator 58 is used, it could be an Apollo Intelligent Meter Red Lion Model IMP23-107 or equivalent. The weigh scale 62 could be any typical load cell weight scale or equivalent. The solids feed equipment 50 could be a hopper with a vibratory feeder or volumetric feeder by K-Tri-on America used with a rotary air lock or equivalent. The flow tube 12 has an input that is kept at a constant distance from the solids feed equipment 50 during the calibration procedure and is maintained at a fixed or equivalent value for the final commercial installation.

Thus, after calibration, any particulate solid fed to the flow meter are indicated by sensor 32 and the sensor output on line 59 is sent to the industrial computer or smart indicator 58 displaying mass rate (sensor output is converted to mass rate via an algorithm determined from calibration) and the mass quantity is displayed by integrating the mass flow rate over time. The sensor 32 has a keypad 54 connected thereto for entering calibration data. The keypad is described in U.S. Pat. No. 5,550,537, which is incorporated herein by reference in its entirety.

With the equipment of the type as indicated earlier and with the sensor tube being at a 35° angle from the vertical with respect to the flow tube as illustrated in FIG. 2A, a vibratory feeder with variable speed controls may be used to keep a constant mass rate through the meter 52. The product, as an example only, may be regular table rolled oats No. 5, ConAgra, Inc., with a bulk density of 25.38–28.84 pounds per cubic foot.

The solids feed equipment 50 should be adjusted until a known pounds/hour of particulate matter such as rolled oats is fed to the flow meter 52 at a constant mass rate such as, for example only, 745.9 pounds/hour. Sensor 32 is set for amplification by pressing "H" key on keypad 54 and then the amplification set at coarse adjustment −2 and then the fine adjustments made through keyboard 54, as well known in the art, until an LED indicates 100% or the maximum of 20 milliamps output from the sensor 32. The sensor is then advanced to the calibration mode through keypad 54.

With the sensor 32 in the calibration mode, the particulate matter in flow path 52 is stopped, and with no material flowing to the flow meter 52, the +/−keys on the keypad 54 are adjusted until an LED on the sensor 32 indicates 0% output or 4.0 milliamps. The "E" key on the keypad 54 is pressed once and the LED flashes for about five seconds to accept zero point. Any previous points are also cleared by pressing the plus (+) and minus (−) keys simultaneously and holding for 3-seconds.

Next, the feed through conduit 51 is set at the selected pounds/hour and the plus/minus keys on keypad 54 are adjusted until the LED displays 100% or 20 milliamps. The "E" key is then pressed once and the LED flashes for about five seconds. Next, the "H" key on the keypad 54 is depressed until at damping mode. Then (+) or (−) keys are depressed until damping mode is set at two seconds. Then, the "H" key is pressed until the unit returns to the run mode. The mass flow through the conduit 51 is then set by adjusting the solids feed equipment 50 to 727.4 pounds/hour (weigh scale 62 will indicate pounds collected over the time interval measured using a stop watch) and the sensor 32 output (milliamps) is measured on connection 55 to computer 56 for several minutes. This calibration data point is used to begin a table such as that shown in Table I. This calibration data point is shown as the first two columns where the average output from the sensor 32 was 19.21 milliamps at the constant mass rate of 727.4 pounds/hour. Thus there is a data pair (mass rate and corresponding sensor output) which in this case is 727.4/hour and 19.21/milliamps.

This procedure is repeated for another different mass flow rate to obtain the average output from the sensor 32 corresponding to the new mass flow rate. Again, a table can be created shown in the first two columns in Table I for as many data pairs as necessary to obtain the accuracy desired.

TABLE I

| Sensor Output (milliamps) | Mass Flow Rate (lbs/hr) | (mA) | (lbs/hr) | |
|---|---|---|---|---|
| 3.90 | 0. | 3.90 | 0.0 | Eq(2) |
| 6.30 | 62.5 | 6.00 | 55.0 | Eq(2) |
| 9.34 | 141.8 | 8.00 | 98.6 | Eq(1) |
| 11.32 | 213.7 | 10.00 | 161.9 | Eq(1) |
| 14.51 | 357.8 | 12.00 | 242.8 | Eq(1) |
| 15.08 | 403.1 | 14.00 | 341.9 | Eq(1) |
| 16.94 | 501.8 | 16.00 | 460.0 | Eq(1) |
| 19.08 | 681.8 | 18.00 | 597.6 | Eq(1) |
| 19.21 | 727.4 | 20.00 | 755.2 | Eq(1) |
| 20.00 | 745.9 | | | |

With that information in the first two columns of Table I, the data pairs are available (mass rate, sensor output) as necessary to obtain an accurate function (algorithm) for obtaining data pairs between these experimental data pairs (interpolation) and beyond these data pairs (extrapolation). A regression analysis is used to analyze these data pairs and find a model or algorithm to predict new values of the dependent variable (mass flow rate) for other values of the independent variable (milliamps).

From the first two columns, using data pairs with milliamps from 9.34 through 20.00, the value of the constants a and b for the algorithm or power equation $F=aE^b$ ($Y=aX^b$) can be determined by simple regression analysis, which is a well-known procedure for relating one dependent variable to one independent variable by minimizing the sum of the squares of the residuals for the fitted equation or line. The value for "a" was determined to be a=0.97247476 and "b" was determined to be b=2.22144851. The coefficient of determination (COD), which is the measure of the fraction of the total variance accounted for by the model equation was 0.99731366. Thus, using the power equation (1) $F=aE^b$ with the values of the constants a and b as described above, a close tit between the predicted data pairs and the experimental data pairs was found as shown in Table I between 8 milliamps through 20 milliamps. These data pairs were then placed into the smart indicator 58 (FIG. 4) as equation (1) in a manner well known in the art.

Similarly, data pairs including 3.9 milliamps and 11.32 milliamps (first two columns in Table I) were used with regression analysis to obtain the constants for algorithm or polynomial equation (2) $F=a_0+a_1E+a_2E^2+a_3E^3+a_4E^4$ ($Y=a_0+a_1X+a_2X^2+a_3X^3+a_4X^4$). The coefficient of determination (COD), which is the measure of the fraction of the total variance account for by the equation or model was 1.00000000. This is an excellent fit of the predicted data pairs and the experimental data pairs as shown in the third and fourth columns of Table I between 3.9 mA through 6 mA. These data pairs are then placed into the smart indicator 58 (FIG. 4) as equation (2) in a manner well known in the art. The constants that are determined for equation (2) are as follows: $a_0=-110.683736$; $a_1=26.1049689$; $a_2=1.6799281$; $a_3=-0.36137862$; and $a_4=0.0205726$.

It should be noted that if industrial computer 58 is used in place of a smart indicator, the actual algorithm (one or more equations such as equations (1) and (2) derived by linear regression) could be used directly as a formula by the industrial computer 58 and not as discrete (separate pairs of data) pairs as required by the smart indicator. The end result would be a greater degree of accuracy to be expected from using an industrial computer 58.

In summary, the data pairs in the first two columns of Table I and obtained from sensor 32 are coupled on line 55 to computer 56 for regression analysis and development of the algorithm, which is then stored in the industrial computer or smart indicator 58. The non-linear results of the sensor output in these tests are shown in the graph of FIG. 5 that plots sensor output versus mass rate through the meter. Note that the sensor output is non-linear.

Figure 6:
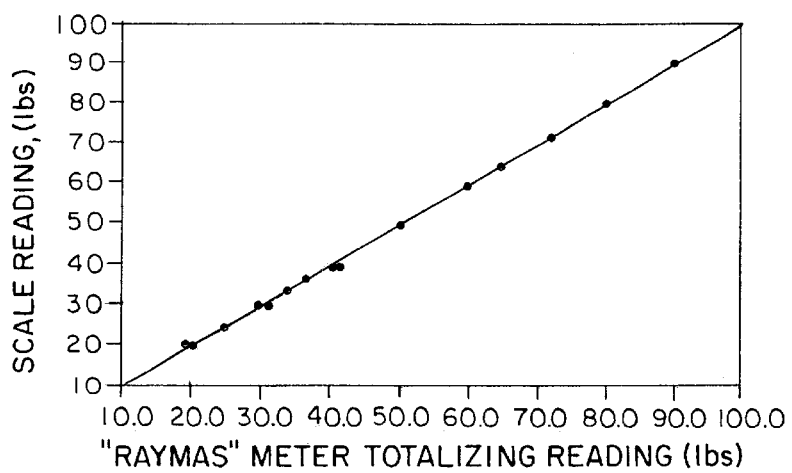
FIG. 6 is a graph illustrating the accuracy of the calibrated flow meter utilizing rolled oats.

Once the meter has been calibrated as indicated previously, a test result utilizing rolled oats is illustrated in the graph of FIG. 6 which compares the meter totalizer reading in pounds versus the scale reading in pounds. Notice the accuracy of the meter is within +/−0.5% over the entire range.

Figure 7:
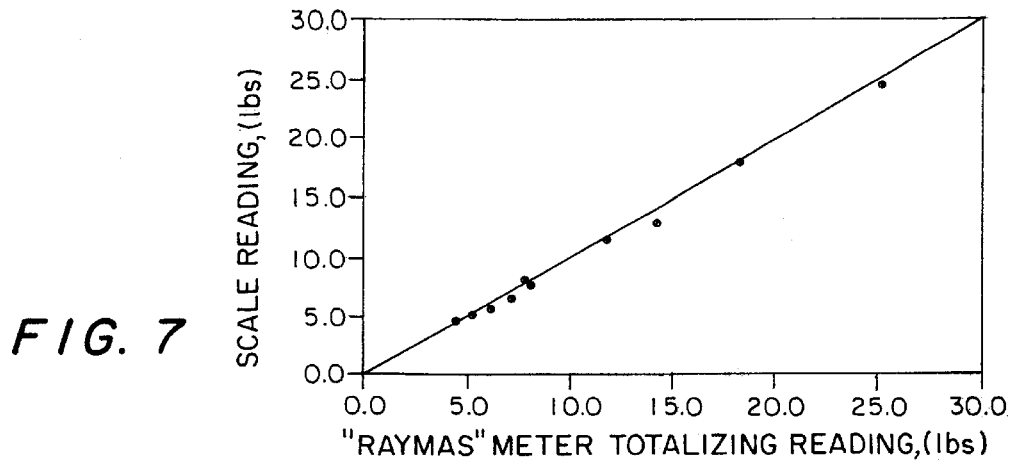
FIG. 7 illustrates the accuracy of the calibrated flow meter for a "Certa" product.

FIG. 7 is a graph illustrating the results from the calibrated mass flow meter for "Certa" Product from General Mills, Inc. The accuracy is +/−1.9%. The material being measured had poor flowability characteristics and it was difficult to maintain constant mass rates. Thus, the accuracy of +/−1.9%.

Figure 8:
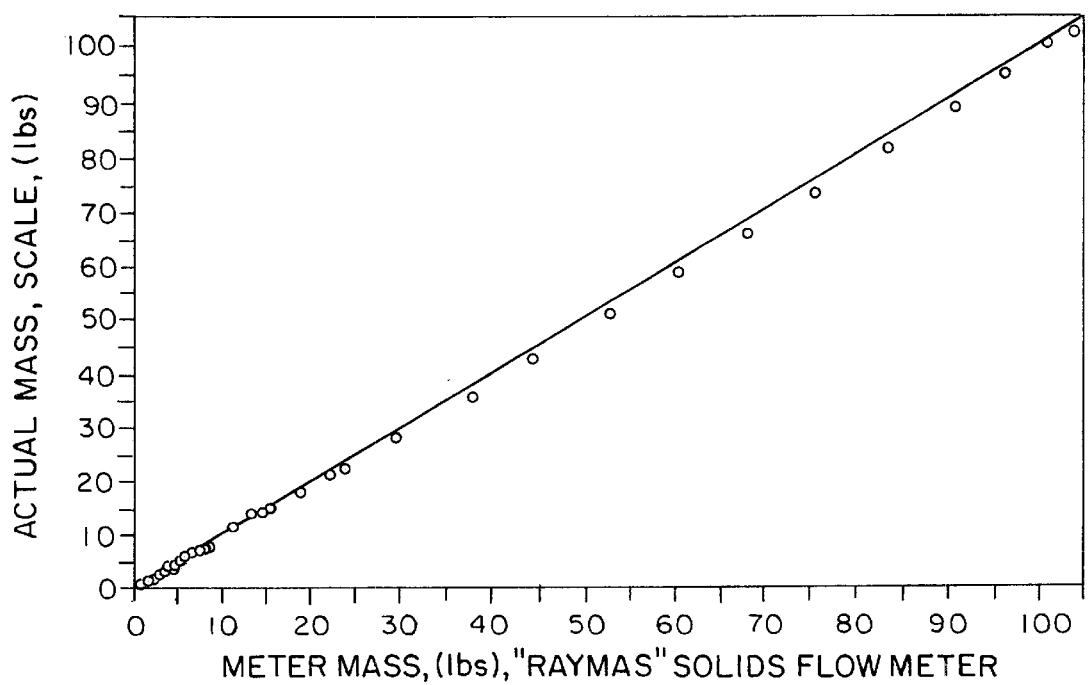
FIG. 8 is a graph illustrating the accuracy of the calibrated meter for use with a berry type cereal.

FIG. 8 is a graph illustrating the accuracy of the calibrated flow meter measuring Crunch Berries® from Quaker Oats Company. An accuracy of +/−1.63% was obtained in the upper range and +/−2.24% in the overall range. Only one equation was used to make up the algorithm, equation (1), and it provided the best fit over a portion of the range. If more than one equation had been utilized, the accuracy would have been improved substantially for this case.

Figure 9:
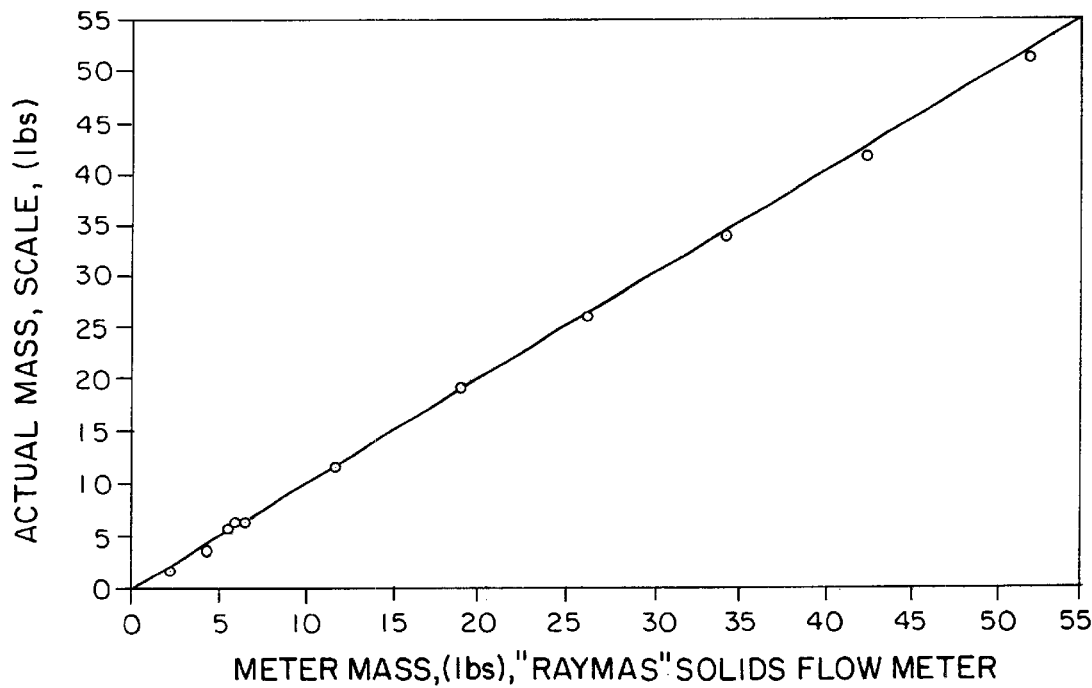
FIG. 9 illustrates the accuracy of the calibrated meter utilizing a Life® Cereal product, re-mill stream.
Figure 12:
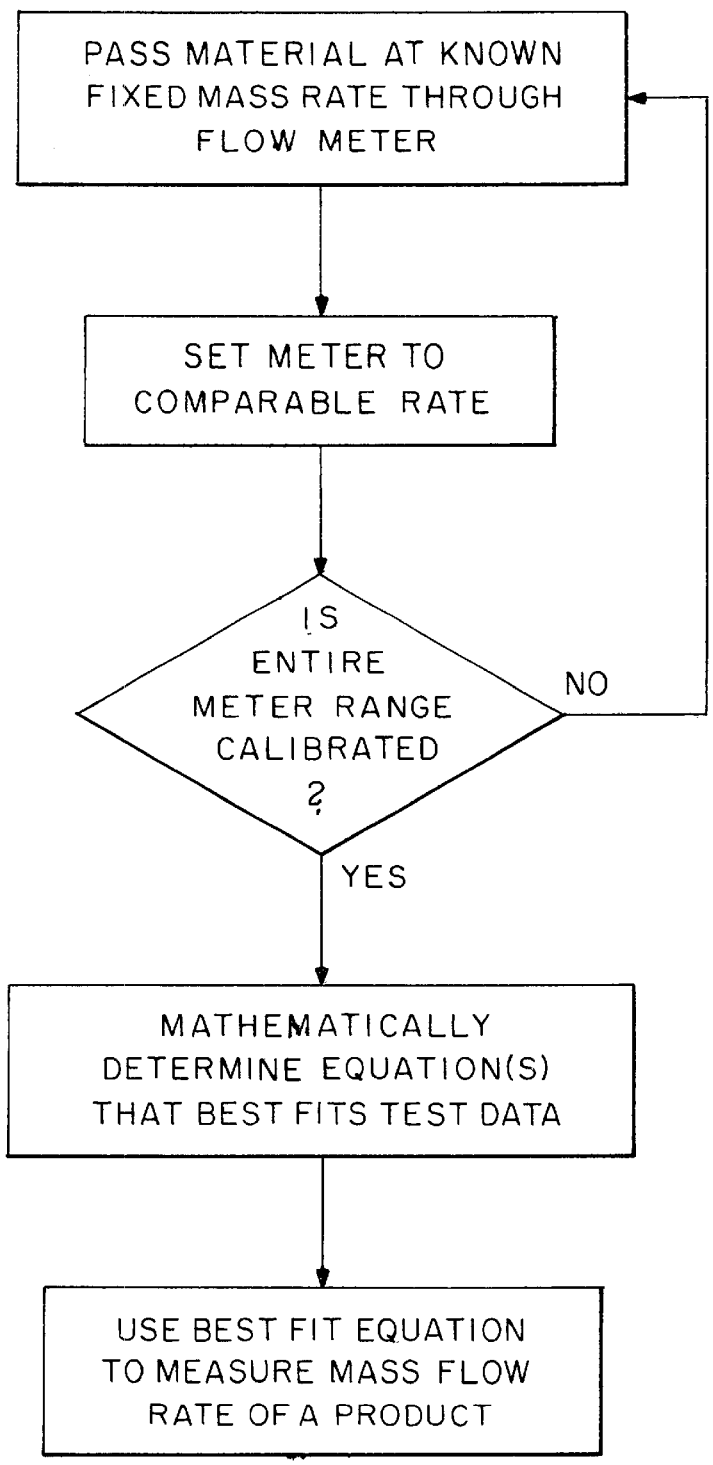
FIG. 12 is a flow diagram for determining the mass flow rate with a mass flow meter of the type shown in FIG. 1.

FIG. 9 is a graph setting forth the accuracy of the calibrated flow meter for measuring Life® Cereal from Quaker Oats Company. As can be seen, an accuracy of +/−0.68% was obtained in the upper range and +/−2.86% in the overall range. Again, only one equation was used to make up the algorithm. The use of both algorithms (1) and (2) would provide a much greater accuracy.

Thus, in the flow meter disclosed in U.S. Pat. No. 5,986,553, the sensor tube has a diameter at least equal to the flow tube. This allows the beam to contact the entire cross-sectional area of the flow tube and thus all particulate materials flowing through the flow tube will come in contact with the beam and cause reflected energy. The flow tube may be a round, square, or rectangular cross-sectional shape. The signal from the sensor is conditioned by at least one algorithm to relate the sensor output to mass rate and quantity (totalizer). The first algorithm is of the power function type $F_1 = aE^b$ ($Y_1 = aX^b$) where E is the independent variable (e.g., sensor output in mA), F is the dependent variable (mass rate), and "a" and "b" are constants obtained from statistical analysis. The second algorithm or equation is of a polynomial function of the type $F_2 = a_0 + a_1 E + a_2 E^2 + a_3 E^3 + a_4 E^4$ ($Y_2 = a_0 + a_1 X + a_2 X^2 + a_3 X^3 + a_4 X^4$) where, again, E is the independent variable, $F_2$ is the dependent variable, and $a_0$, $a_1$, $a_2$, $a_3$, and $a_4$ are constants obtained from statistical analysis. Thus, in one embodiment the algorithm is a combination of a polynomial function and a power function in order to correlate the sensor output with the matching mass rates over the entire range so as to obtain accurate indications of mass rate and quantity. It is to be understood, of course, that even greater accuracy could be obtained by utilizing further equations such as $F_3 = ae^{bE}$ ($Y_3 = ae^{bX}$), where a and b are constants, $F_3$ is the mass rate, and E is sensor output in milliamps for some specific range between 4 to 20 milliamps. Again, the constants would be determined by regression analysis. Further, an equation such as $F_4 = e^{a+bE}$ ($Y_4 = e^{a+bX}$), where a and b are constants, $F_4$ is the mass rate, and E is the sensor output in milliamps for some specific range between 4 and 20 milliamps with the constants being determined by regression analysis from specific points as set forth earlier. Also $F = a + bE$ ($Y = a + bX$) could also be used where E, F, a, and b have the definitions set forth above.

In the laboratory calibration of a meter of the type discussed in U.S. Pat. No. 5,986,553, for a specific material, a fixed or constant particulate solid rate (mass rate) is passed through the meter and corresponding sensor output is recorded. This step is repeated until the mass rates corresponding to the sensor's output range from 4 to 20 milliamps is determined.

Second, the total output sensor data from 4–20 milliamps and the corresponding mass rate data are analyzed mathematically (typically by regression analysis such as the method of least squares) to determine which of the mathematical equations ($F_1$, $F_2$, $F_3$, or $F_4$) best fit the data. One equation may fit the date over the entire 4–20 milliamp range accurately or two or more may equations may be needed to accurately fit the data over the entire range. Thus, again, as an example, using three equations, the mass rate F and the sensor output E could be represented over the entire sensor output range of 4–20 milliamps by the following algorithm which uses three equations:

$F = a_{o,1} + a_{1,1} E + a_{2,1} E^2 + a_{3,1} E^3 + a_{4,1} E^4$ (for the sensor output range 4 to $\leq 5.6$ milliamps)

$F = a_{1,2} E_2^{b_{1,2}}$ (for the sensor output range $E_2$ from >5.6 to $\leq 18.1$ milliamps)

$F = a_{1,3} e^{b_{1,3} E_3}$ (for the sensor output range $E_3$ from >18.1 to $\leq 20$ milliamps).

It is understood in the above example that the constants $a_{0,1}$, $a_{1,1}$, $a_{2,1}$, $a_{3,1}$, and $a_{4,1}$ are determined by mathematical methods such as regression analysis using the mass rate data and corresponding sensor output data for the sensor output range from $4 \leq 5.6$ milliamps: the constants $a_{1,2}$ and $b_{1,2}$ are determined by mathematical methods such as regression analysis using the mass rate data and corresponding sensor output data for the sensor output range from >5.6 to $\leq 18$, milliamps; and the constants $a_{1,3}$ and $b_{1,3}$ are determined by mathematical methods such as regression analysis using the mass rate data and corresponding sensor output data for the sensor output range from >18.1 to $\leq 20.00$ milliamps.

The above, of course, is just an example. Many different equations may be used to obtain a desired algorithm for better accuracy.

Prior art FIG. 10 is a variation of the flow meter disclosed in U.S. Pat. No. 5,986,553, that utilizes pneumatic conveying of the flowable material. In this case, the materials are provided from hopper 66 through a rotary air lock 68 to a flow tube 70. The pneumatic conveying gas or vapor inlet at 72 conveys the material through tube 70, the solids flow meter 12, and the output line 74 to a product receiver 76. The material in the receiver may be conveyed through air lock 78 to a product out-flow line 80. The pneumatic conveying gas or vapor may flow out at 82. The sensor 32 in the solids flow meter 12 operates as described previously. The gas or vapor velocity used to transport the particulate solid material through a duct should be nearly the same during the calibration of the flow meter as it will be for induced conditions under which the meter will finally operate.

Prior art FIGS. 11A, 11B and 11C disclose the use of two or more side by side sensors used with the concept disclosed in U.S. Pat. No. 5,986,553. In FIG. 11A, a side view of the flow tube is shown with the beams 88,90 being illustrated as one beam inasmuch as they are parallel and are provided by sensors 84 and 86, only one of which can be seen in the side view in FIG. 11A.

FIG. 11B is a top view of a rectangular flow tube 24 with two sensors 84 and 86 positioned on the sensor tube 26. Sensor 84 generates beam 88 and sensor 86 generates beam 90. It will be noted that the beams 88 and 90 include and overlap area 92. This same overlap area is illustrated in FIG. 11C which is a top view of a circular flow tube. Note that the distance of the sensors 84 and 86 from flow tube 24 is adjusted such that their beams 88 and 90 intersect at the outer periphery of the flow tube to ensure that the entire flow tube is covered by the beams 88 and 90. The two sensors 84,86 send out beams 88 and 90 of low microwave energy at the same fixed frequency. The moving particles reflect the energy beams and thereby the receivers at the sensors measure the total reflected Doppler-shifted energy. Since the moving particles create a Doppler-shifted energy that is reflected back to the sensors 84 and 86, the sensors 84 and 86 measure the intensity of the total signal reflected back. An average of the two sensor signals is taken. Thus, the average of the sensors' output signals is the "E" in equations (1) and (2) (algorithms 1 and 2). Then the two equations $F_1$ and $F_2$ could be used to represent the algorithm. Thus, the average output from the sensors is mathematically correlated with the total mass rate through the meter. This is the typical calibration method described earlier herein using only one sensor output signal. With two or more sensor outputs, an average value is used or some weighted average mathematical value of the sensor output signal is used and is correlated with the mass rate. The on-site adjustment technique discussed above with respect to FIG. 1 is equally applicable to the embodiment discussed in FIGS. 10 through 11C.

The calibration technique discussed above with respect to FIGS. 1 and 2A provides an illustration of the excellent and superior results for most applications and installations. However, it has been discovered that sensor 32 is extremely sensitive. Further, some on-site installations require the use of various types of equipment to move the particulate material away from the flow meter after being measured. As an example, a screw conveyor may be present at the bottom of the discharge end of flow tube 24 to move the particulate material away from flow meter 12. In such installations, the rotational motion of the screw conveyor may be sensed by sensor 32 as additional flow of the solid particulate material if the distance 91 between the sensor tube 26 and discharge end or outlet 28 of flow tube 24 is not of sufficient length. Other types of "machinery motion" located at the discharge end of the mass flow meter and which may cause erroneous readings include, but are not limited to, agitators, rotating shafts and the operation of valves such as slide-gate valves, ball-valves, etc. Although the preferred correction or remedy may be to increase distance 91, in many installations the physical constraints of the equipment simply will not permit this. It might be possible to recalibrate the meter on site rather than at the factory or in a laboratory, but this would require disrupting the installation and undesired movement and connection of heavy and expensive equipment such as scales, etc. A simpler and better method is desirable.

Therefore, according to the present invention, it has been discovered that although the mass flow rate indicated by a newly installed meter may be very much in error and appear to be of no value, the basic algorithm or the basic shape of the performance curve as calibrated or obtained in the laboratory or at the factory in the manner discussed heretofore still represents the relative performance of the flow meter. This means that when the algorithm is adjusted according to the teachings of this invention a full recalibration is not necessary.

Figure 13:
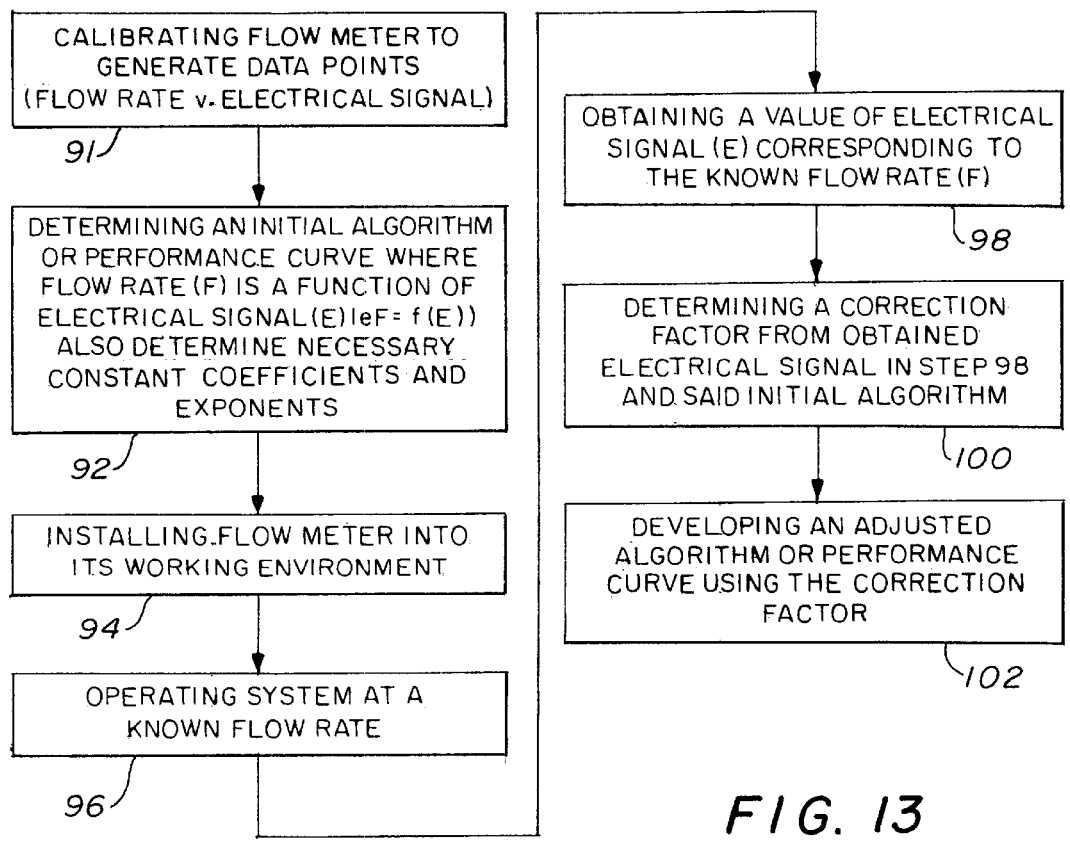
FIG. 13 is a flow diagram of the method of the present invention for correcting the readings of a mass flow meter due to errors caused by sensed motion other than motion of the particulate material being measured.

For example, referring now to FIG. 13 and assuming a sensor 32 having a nominal 4 milliamps to 20 milliamps output, there is shown a flow diagram for an on-site adjustment or recalibration of a mass flow meter, according to the teachings of this invention. In FIG. 13, data points are obtained during calibration at the laboratory or at the manufacturing location as indicated at 91. Then, as shown at step 92, the data points obtained in the laboratory are used to develop or determine the initial algorithm or performance curve where flow rate (F) is a function of an electrical signal (E) as was discussed heretofore. Then, as shown at step 94, the calibrated flow meter is installed in its working environment. The system is then operated under working conditions and at a known flow rate as indicated at step 96. The value of a corresponding electrical signal corresponding to the known flow rate is then obtained as shown in step 98. According to various embodiments and as will be discussed later, the value of the electrical signal may be obtained by simply reading the flow meter at the known flow rate of zero to adjust for machinery motion. Alternately in an embodiment for adjusting due to error caused by dust the correction factor is calculated from the initial algorithm by using a known positive flow rate (F) and the previously determined constant coefficients and exponents to calculate a corresponding electrical signal E. Then a correction factor is determined by using the obtained electrical signal in step 98 whether by simply reading the sensor in the case of correcting for machinery motion or by calculating the electrical signal value as in the case of correcting for particulate dust, etc. In the embodiment for correcting for machinery motion and as indicated in step 100 a flow rate correction factor is computed or calculated from the initial algorithm and the electrical reading obtained in step 98. In the embodiment for correcting for excessive dust, steps 98 and 100 are essentially the same step, and the correction factor is the electrical signal E calculated in step 98. Then as shown at step 102 the adjusted algorithm or performance curve is developed by subtracting the correction factor from the appropriate parameter F (for machinery motion correction) or E (for dust correction). In the embodiment for correcting for machinery motion, the flow rate correction factor F is subtracted from the indicated flow rate for each electrical signal value. In the embodiment for correcting for excessive dust, the obtained electrical signal correction factor is subtracted from the electrical signal value of the initial algorithm for each sensor reading and the flow rate for the corrected electrical signal as indicated by the initial algorithm is used to determine the correct flow rate.

More specifically and for purposes of explanation, to adjust or correct the initial algorithm or performance curve for machinery motion. Table II shows typical calibration points that might be obtained for a flow meter having a maximum flow rate at some value somewhat in excess of 5,000 lb/hour.

TABLE II

| Sensor Output (mA) | Mass Flow Rate lbs/hour |
| --- | --- |
| 3.986 | 0.0 |
| 6 | 585.4 |
| 8 | 1037.3 |
| 10 | 1489.2 |
| 12 | 1976.5 |
| 14 | 2656.0 |
| 16 | 3430.9 |
| 18 | 4299.9 |
| 20 | 5262.3 |

Figure 14:
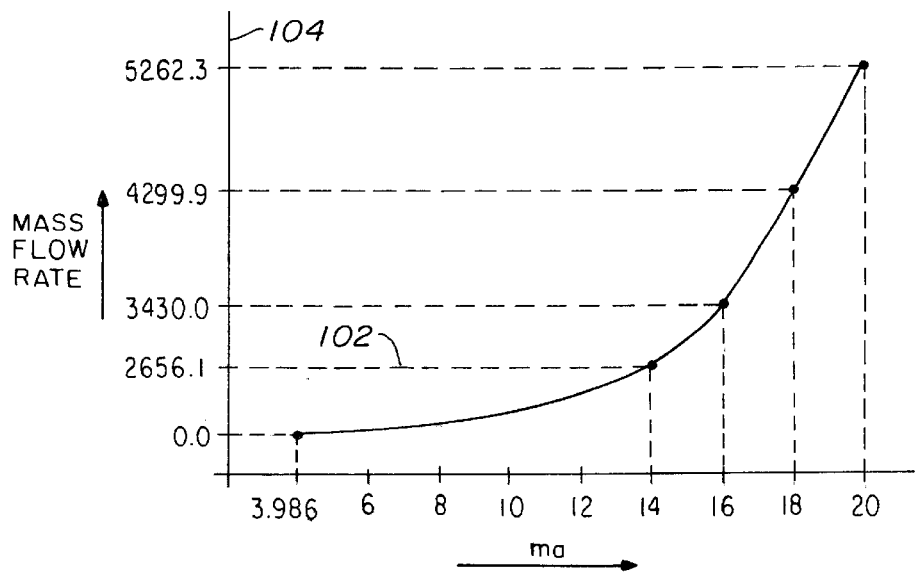
FIG. 14 is an example of a performance curve or algorithm of a mass flow meter developed in a laboratory or at the factory.
Figure 15:
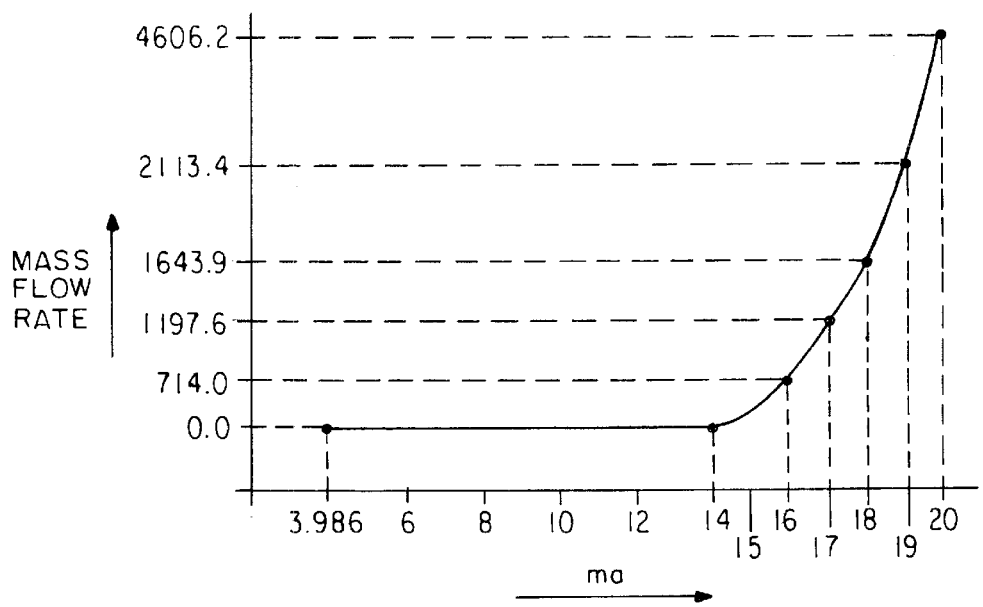
FIG. 15 is an example of the performance curve of FIG. 14 after correction according to the teachings of this invention.

In the example shown, 20 milliamps was calibrated to represent about 5262.3 lbs/hour. FIG. 14 is the performance curve or algorithm developed from the laboratory calibration points. The calibrated flow meter is then installed in its working location as discussed above with respect to step 94 of FIG. 13. The system machinery used to move the solid particulate material away from the flow meter is then turned on as shown in step 96 of FIG. 13. However, the flow of particulate material through the meter is blocked, diverted or simply no material is available. That is, the "known" flow rate through the flow meter shown at step 96 is zero ("0"). A reading is taken from the flow meter as the machinery, which moves the particulate material away from the discharge end of the flow meter, continues to operate with the known zero flow rate and is the obtained corresponding electrical signal of step 98 of FIG. 13. Then at step 100, a flow rate (F) correction factor is determined by referring to the initial algorithm. At step 102 an adjusted algorithm or performance curve is developed using the correction factor performance curve of FIG. 14. In this embodiment or as also indicated in Table II, the flow rite indicated for 14 milliamps corresponds to a 2656.1 lbs/hour correction factor as indicated by the intersection of line 102 of FIG. 14 with the vertical (or mass flow rate lbs/hour) coordinate 104. This flow rate value is then used to develop a corrected performance curve or algorithm by subtracting the correction factor 2656.1 lbs/hour from the mass flow rate indicated by the original algorithm or performance curve shown in FIG. 14 at each milliamp value. Table III shows the milliamp readings and the corresponding adjusted mass flow rate, and FIG. 15 illustrates the resulting or adjusted performance curve as developed at block 102 of FIG. 13.

TABLE III

| Sensor Output (mA) | Mass Flow Rate (lbs/hour) |
| --- | --- |
| 3.986 | 0.0 |
| 14,000 | 0.0 |
| 14,500 | 184.8 |
| 15,000 | 375.6 |
| 16,000 | 774.8 |
| 17,000 | 1197.6 |
| 18,000 | 1643.9 |
| 19,000 | 2413.4 |
| 20,000 | 2606.2 |

In addition to correcting for erroneous mass flow readings due to the motion of machinery, the present method has also been found to be effective in correcting for errors resulting from other "motion" sensed by the sensor 32 which is not from the flow of the solid particulate material being measured. For example, it has also been discovered that the basic shape of the performance curve or algorithm generated under laboratory conditions is representative of the actual performance of the flow meter of FIGS. 1 and 10 even though the absolute values of the indicated mass flow rates are not even close to being accurate. More specifically, during the laboratory calibration of a flow meter to be used with Green Oats, there was a significant amount of oats dust. This dust was sensed as motion and resulted in an erroneous calibration of the mass flow rate as indicated by the milliamp output reading of sensor 32. Thus, the mass flow rate indicated by a particular milliamp reading on the calibrated performance curve was significantly greater than the actual mass flow rate occurring during calibration. This error was discovered when the flow meter was installed in its working environment and tested under operating conditions. The working environment included equipment which eliminated or reduced the oats dust to a level substantially less than was experience at the laboratory. Consequently, the actual mass flow rate was substantially greater than that indicated by the initial algorithm or performance curve when referenced against a specific milliamp reading from sensor 32.

Figure 16:
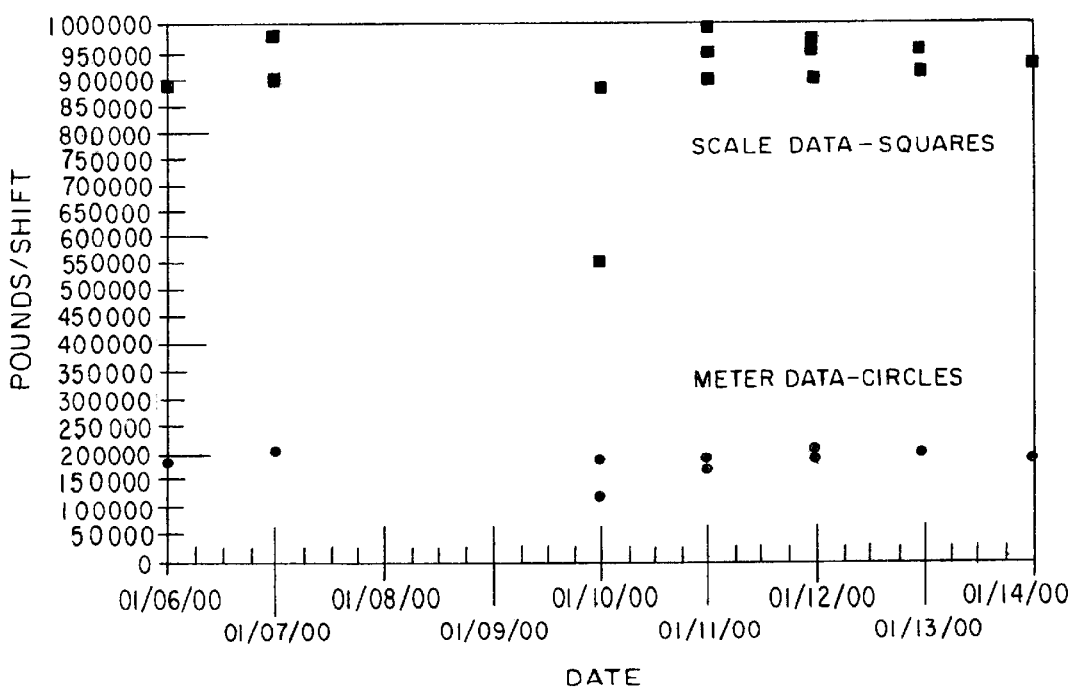
FIG. 16 is a chart showing the total weight per day of Green Oats flowing through a flow meter and the total weight as indicated by the flow meter.

Referring now to FIG. 16, there is shown (by circles) the indicated total weight of Green Oats delivered per day by a system using the "calibrated" mass flow meter. The square data points indicate the actual total weight per day. The indicated values from the flow meter are seen to be less than ¼ of the actual values. Such erroneous readings without correction would of course be unacceptable. Thus, as was discussed above, one of the data points indicating actual flow rate per hour was used in the original algorithm to calculate the corresponding electrical signal used as the correction factor.

Figure 17:
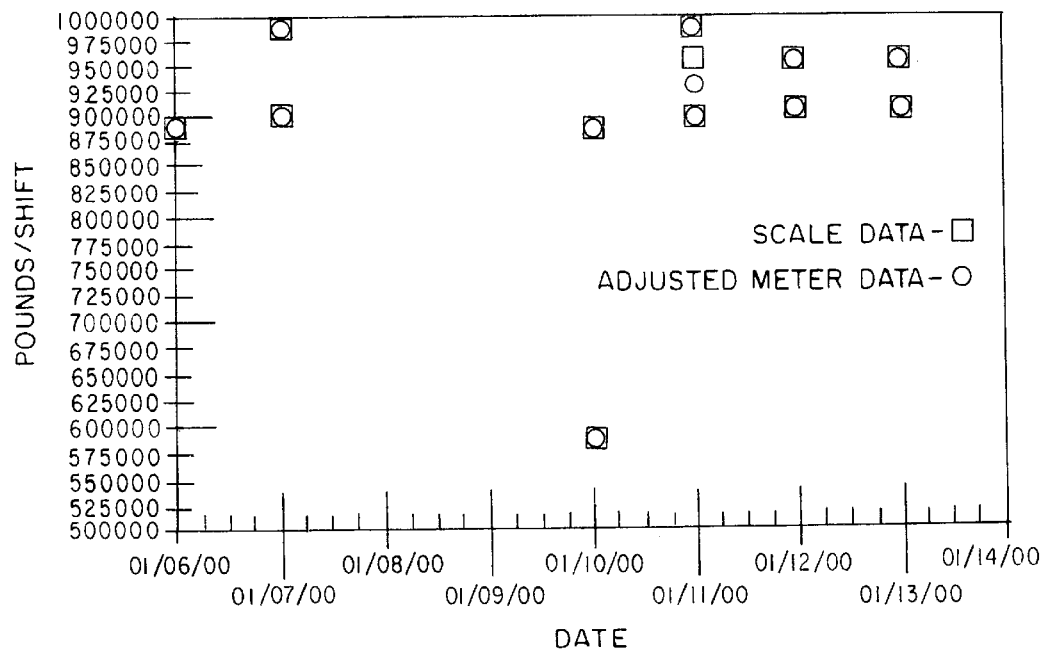
FIG. 17 shows the close correlation of the actual total weight as illustrated in FIG. 16, and the total weight indicated by the flow meter after being corrected according to the teachings of this invention.
Figure 18:
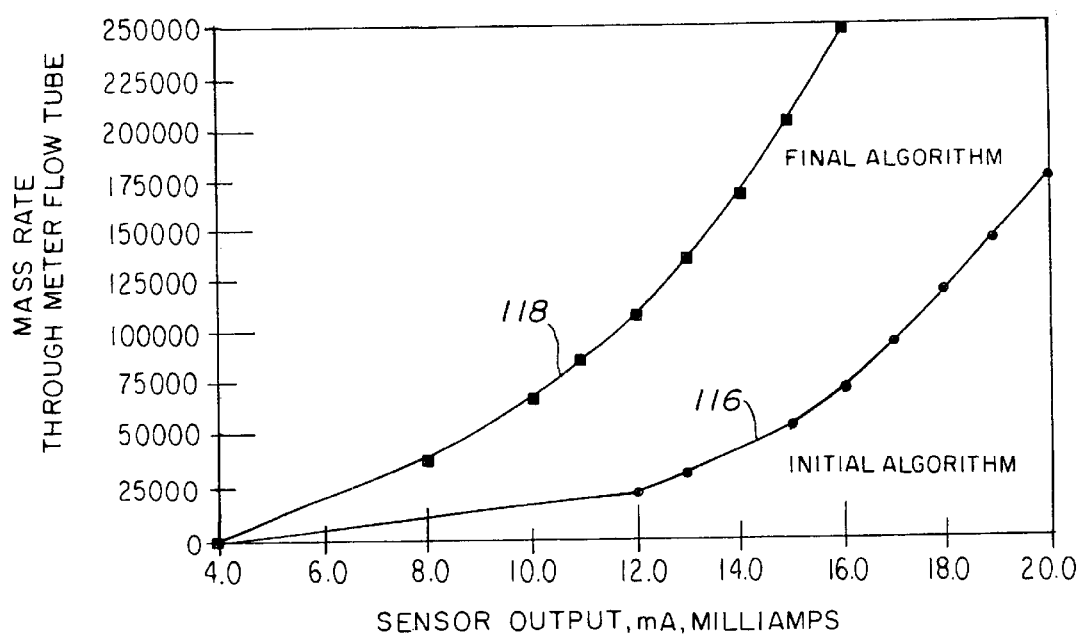
FIG. 18 shows the initial performance curve or algorithm of the flow meter used to obtain the charts of FIGS. 16 and 17 and the performance curve after beings corrected according to the teachings of the present invention.

The adjusted or correction procedure discussed above with respect to FIG. 13 when applied to the oats dust situation also provided an extremely accurate adjustment. FIG. 17 shows how closely the readings correspond to the actual readings once the adjustment procedure of the present invention is applied to the original (although erroneous) calibration curve. FIG. 18 shows the performance curve 116 representing the initial algorithm and the performance curve 118 after being adjusted according to the teachings of this invention.

Thus, there has been disclosed a compensation technique for correcting readings from a Doppler-radar flow meter wherein the sensor beam covers the entire cross-sectional area of the flow tube in order that all particulate materials flowing through the flow tube will come in contact with the beam and provide reflected Doppler-shifted energy.

The corresponding structures, materials, acts, and equivalents of all means or step plus function elements in the claims below are intended to include any structure, material, or act for performing the function in combination with other claimed elements as specifically claimed.

What is claimed is:

1. In a system for moving particulate matter and using a flow meter for measuring the mass flow rate of particulate matter as a parameter (F) by radiating the entire flow path through a conduit portion with electromagnetic energy such that substantially all of the particulate matter contributes to the generation of backscatter energy and receiving said backscatter energy to generate an electrical signal as a parameter (E) proportional to the concentration of particulate matter flowing in said conduit a method of correcting motion sensed by said flow meter not caused by the actual flow of particulate matter being) measured to obtain a corrected flow rate comprising the steps of:

generating data points for said flow meter showing the value of said electrical signal parameter at different values of said mass flow rate parameter of selected particulate materials between "0" flow rate and a selected upper limit flow rate;

determining an initial algorithm representative of at least a portion of said generated data points wherein said initial algorithm defines a flow rate parameter (F) as a function of said electrical signal parameter (F);

determining constant coefficients and exponents of said function;

installing said flow meter into its working environment;

operating said system with said installed flow meter at a known flow rate of said particulate material through said conduit and determining a corresponding electrical signal;

computing a correction factor for a selected one of said flow rate or said electrical signal from said determined corresponding electrical signal and said initial algorithm; and subtracting said correction factor from the corresponding selected flow rate or electrical signal in said initial algorithm to obtain an adjusted algorithm representing said flow rate as a function of said electrical signal in said working environment.

2. A method of correcting for sensed machinery motion in said system according to the method of claim 1 wherein said known flow rate is zero, said step of determining a corresponding electrical signal comprises the step of reading the value of said electrical signal from said flow meter at said zero flow rate and said step of computing said correction factor comprises the step of setting the electrical signal (E) to said corresponding electrical signal value read from said flow meter and computing said flow rate (F) from said initial algorithm as said correction factor.

3. A method of correcting a flow meter for dust and particulate movement beyond said conduit portion according to the method of claim 1 wherein said step of determining a corresponding electrical signal and said step of computing said correction factor are a single step comprising setting flow rate (F) of said initial algorithm to said known flow rate and computing the electrical signal (E) as said correction factor from said initial algorithm.

4. The method of claim 1 wherein said solid particulate matter flows past said sensor at a substantially constant velocity.

5. The method of claim 4 wherein said method further comprises the step of providing a source of pneumatic pressure coupled to said first conduit for conveying said particulate matter past said sensor at said substantially constant velocity.

6. The method of claim 1 wherein said generated electrical signal is non-linear and provided in milliamps.

7. The method of claim 2 wherein said step of operating said system includes operating machinery having motion at the discharge end of said flow meter and said sensed machinery motion is the operation of said machinery.

8. The method of claim 7 wherein said operating machinery is a rotating screw conveyor.

9. The method of claim 1 wherein said function is of the form $Y=aX^b$ where Y=flow rate (F) and X=electrical signal (E).

10. The method of claim 1 wherein said function is of the form $Y=a_0+a_1X+a_2X^2+a_3X^3+a_4X^4$, where Y=flow rate (F) and X=electrical signal (E).

11. The method of claim 1 wherein a first portion of said generated data points are defined by a first function and a second portion of said generated data points are defined by a second function.

12. The method of claim 11 wherein said first function has the same form as said second function but at least one of said constant coefficients and said exponents are different.

13. In a system for moving particulate matter and using a flow meter for measuring the mass flow rate of particulate matter as a parameter (F) by radiating the entire flow path through a conduit with electromagnetic energy such that substantially all of the particulate matter contributes to the generation of backscatter energy and receiving said backscatter energy to generate an electrical signal as a parameter (E) proportional to the concentration of particulate matter flowing in said conduit, a method of correcting motion sensed by said flow meter not caused by the actual flow of particulate matter being measured to obtain a corrected flow rate comprising the steps of:

generating an initial algorithm or performance curve for said flow meter showing the value of said electrical signals at different values of said mass flow rates of particulate materials between "0" flow rate and a selected upper limit flow rate;

installing said flow meter into its working environment;

operating said system at a known flow rate of said particulate material through said conduit to obtain a corresponding electrical signal;

determining from said initial algorithm or performance curve and said corresponding electrical signal a correction factor; and subtracting said correction factor from a corresponding value in said initial algorithm to obtain an adjusted flow rate.

14. The method of claim 13 wherein said solid particulate matter flows past said sensor at a substantially constant velocity.

15. The method of claim 14 wherein said method further comprises the step of providing a source of pneumatic pressure coupled to said first conduit for conveying said particulate matter past said sensor at said substantially constant velocity.

16. The method of claim 13 wherein the electrical signal generated by said receiver is generated as a non-linear signal.

17. The method of claim 16 wherein said generated non-linear electrical signal is provided in milliamps.

18. In a system for moving particulate matter and using a flow meter for measuring the mass flow rate of particulate matter by radiating the entire flow path through a conduit with electromagnetic energy such that substantially all of the particulate matter contributes to the generation of backscatter energy and receiving said backscatter energy to generate an electrical signal proportional to the concentration of particulate matter flowing in said conduit, a method of correcting motion sensed by said flow meter not caused by the actual flow of particulate matter being measured to obtain a corrected flow rate comprising the steps of:

generating a performance curve showing the value of said generated electrical signals at different mass flow rates of particulate materials between "0" flow rate and a selected upper limit flow rate;

installing said flow meter into its working environment;

operating said system at operating conditions at a zero flow rate of said particulate material through said conduit to obtain a first generated electrical signal;

determining from said performance curve a first flow rate represented by said first generated electrical signal; and subtracting said first flow rate from a flow rate indicated by said flow meter during actual operation for each electrical signal value to obtain an adjusted algorithm or performance curve to provide corrected flow rate values.

19. The method of claim 18 wherein said step of operating said system includes operating a screw conveyor at discharge end of said flow meter.

20. The method of claim 19 wherein said flow rate indicated by said flow meter during actual operation represents particulate flow plus motion from said screw conveyor.

* * * * *